(12) United States Patent
Shimizu

(10) Patent No.: US 8,878,491 B2
(45) Date of Patent: Nov. 4, 2014

(54) BATTERY VOLTAGE MONITORING APPARATUS

(75) Inventor: Takumi Shimizu, Yokkaichi (JP)

(73) Assignee: Denso Corporation, Kariya (JP)

( * ) Notice: Subject to any disclaimer, the term of this patent is extended or adjusted under 35 U.S.C. 154(b) by 560 days.

(21) Appl. No.: 13/037,680

(22) Filed: Mar. 1, 2011

(65) Prior Publication Data

US 2011/0210700 A1 Sep. 1, 2011

(30) Foreign Application Priority Data

Mar. 1, 2010 (JP) ................................. 2010-044192

(51) Int. Cl.
*H02J 7/00* (2006.01)

(52) U.S. Cl.
CPC ............. *H02J 7/0021* (2013.01); *H02J 7/0016* (2013.01)
USPC .......................................... 320/116; 320/120

(58) Field of Classification Search
CPC ............................... H02J 7/0016; H02J 7/0021
USPC .................................................. 320/116, 120
See application file for complete search history.

(56) References Cited

U.S. PATENT DOCUMENTS 8,264,204 B2 * 9/2012 Nagaoka et al. ............... 320/136
2007/0152635 A1 * 7/2007 Hofer ............................. 320/116

FOREIGN PATENT DOCUMENTS

JP 2007-244058 9/2007
JP P2010-081692 A 4/2010

OTHER PUBLICATIONS

Japanese Office Action dated Mar. 13, 2012, issued in corresponding Japanese Application No. 2010-044192, with English translation.

* cited by examiner

*Primary Examiner* — Drew A Dunn
*Assistant Examiner* — Nathaniel Pelton
(74) *Attorney, Agent, or Firm* — Nixon & Vanderhye PC

(57) ABSTRACT

Each monitor IC in the apparatus obtains operation power from a block including cells that are the objects to be monitored. The monitor IC includes a consumption-current adjusting circuit that adjusts a consumption current used from the operation power to a target value. In each monitor IC, the consumption current is adjusted to have the target value by the consumption-current adjusting circuit, and thus the consumption currents of the monitor ICs can be equalized, even if a different number of cells are connected to each monitor IC. Accordingly, it is possible to prevent the variation in the consumption currents among the monitor ICs.

2 Claims, 4 Drawing Sheets

BATTERY VOLTAGE MONITORING APPARATUS

CROSS-REFERENCE TO RELATED APPLICATION

This application is based on and claims the benefit of priority from earlier Japanese Patent Application No. 2010-44192 filed Mar. 1, 2010, the description of which is incorporated herein by reference.

BACKGROUND OF THE INVENTION

1. Field of the Invention

The present invention relates to a battery voltage monitoring apparatus used to monitor battery voltage.

2. Description of the Related Art

There has been proposed in, for example, Japanese Unexamined Patent Publication No. 2007-244058 a capacity adjustment apparatus, which includes monitor integrated circuits (hereinafter referred to as monitor ICs) each of which monitors the state of cells connected in series. The "capacity" in this publication means a charge level or an SOC (state of charge). In this capacity adjustment apparatus, each monitor IC is responsible for the same number of cells.

If the capacity adjustment apparatus is designed to receive operation power from the cells, which are the objects to be monitored, a consumption current in each monitor IC can vary. Therefore, it has been proposed that the capacity adjustment apparatus should discharge the cells in accordance with the variation in the consumption currents between the different monitor ICs, for equalization of the capacity of the cells.

Although in the conventional prior art (the capacity adjustment apparatus) each of the monitor ICs is responsible for the same number of cells, the number of cells to be provided to each monitor IC is not always the same. Therefore, as the number of the cells connected to each of the monitor ICs differs, the consumption current flowing in each of the monitor ICs varies. This is because each monitor IC has a resistance load, and the higher the applied voltage is, the higher the current consumption is. As a result, if the monitor ICs with different current consumptions are used continuously, the voltages of the cells in each of the monitor ICs vary, and thus it is necessary to frequently equalize the voltages of the monitor ICs.

In order to properly equalize the voltages of the cells, it is necessary to perform the equalization operation while a vehicle is stopped. However, the equalization of the voltages of high capacity cells requires a considerable amount of time. If the equalization is required frequently, there may be insufficient time to properly perform the equalization operation for vehicles such as taxis, which run continuously.

The same problem may take place, not only when the capacity adjustment apparatus is mounted on a vehicle, but also when the capacity adjustment apparatus is used continuously in a factory, for example.

SUMMARY

It is therefore desired to provide a battery voltage monitoring apparatus, which is able to prevent the variation in the consumption currents among a plurality of monitor ICs.

According to a first embodiment, each of a plurality of monitor integrated circuits (monitor ICs) obtains operation power from a block configured by cells, which are the objects to be monitored. Each of the monitor ICs includes a consumption-current adjusting circuit that adjusts a consumption current to a target value.

With such a configuration, each monitor IC is allowed to adjust the consumption current to the target value using the consumption-current adjusting circuit, and thus it is possible to equalize the consumption currents of the monitor ICs, even if each monitor IC is connected to a different number of cells. Accordingly, it is possible to prevent the variation in the consumption currents among the monitor ICs.

According to a second embodiment, the consumption-current adjusting circuit includes a discharge circuit that discharges the block to adjust the consumption current to the target value. As the discharge circuit discharges the block, it is possible to adjust the consumption current of the monitor IC.

According to a third embodiment, the consumption-current adjusting circuit includes a shunt resistance through which the consumption current flows, and a consumption-current determination circuit. The consumption-current determination circuit determines a consumption current flowing in the shunt resistance on the basis of the voltage difference between the ends of the shunt resistance. The consumption-current determination circuit permits the discharge circuit to discharge to allow the consumption current to have the target value on the basis of the determined result.

Since the consumption-current determination circuit determines the volume of the consumption current flowing in the shunt resistance, and permits the discharge circuit to discharge based on the determined result, it is possible to perform a proper and reliable control in each of the monitoring ICs.

According to a fourth embodiment, each of the monitor ICs outputs the determined result about the consumption current determined by the consumption-current determination circuit, and receives the determined results of the consumption currents determined by other monitor ICs, thereby sharing the determined results about the consumption currents among the plurality of monitor ICs. Further, the consumption-current determination circuit in each monitor IC determines the consumption current having the largest value, among the consumption currents determined in the plurality of monitor ICs, as a target value, and orders the discharge circuit to discharge so that the consumption current can have the target value.

Since the target value of the consumption current in each monitor IC can be set to the consumption current having the largest value determined by any one of the monitor ICs, it is possible to most suitably equalize the consumption currents among the monitor ICs.

According to a fifth embodiment, the consumption-current adjusting circuit includes a block-voltage-detection circuit that detects the voltage of a block, and a target setting circuit. The target setting circuit detects the number of cells which configure the block, on the basis of the voltage of the block. The target setting circuit further determines the discharge rate so that the consumption current can have the target value, on the basis of the detected number of the cells. The target setting circuit orders the discharge circuit to discharge the determined discharge amount.

Since the discharge amount of the block is determined based on the number of the cells configuring the block, it is possible to adjust the consumption current so that the consumption current can have the target value in each of the monitor ICs, thereby preventing the variation in the consumption currents among the plurality of monitor ICs.

According to a sixth embodiment, the consumption-current adjusting circuit includes a temperature-detection circuit that detects the temperature of the monitor IC. The target setting circuit determines the target value based on the detected number of the cells and the temperature of the monitor IC detected by the temperature-detection circuit.

The consumption current is correlated with the temperature of the monitor IC. Therefore, it is possible to determine the target value of the consumption current more accurately with an addition of the temperature of the monitor IC, using the target setting circuit.

According to a seventh embodiment, each of the monitor ICs outputs the target value of the consumption current, which is determined by the target setting circuit, to other monitor ICs, and inputs the target values of the consumption currents of other monitor ICs, whereby the target values of the consumption currents are shared by the plurality of the monitor ICs. The target setting circuits in the monitor ICs designate the largest value among the consumption currents as the target value, and order the respective discharge circuits to discharge so that the consumption currents can have the target value.

According to this embodiment, the target value of the consumption current in each of the monitor ICs can have the target value that is the largest value among the plurality of monitor ICs, so that it is possible to most properly equalize the consumption currents among the plurality of monitor ICs.

BRIEF DESCRIPTIONS OF THE DRAWINGS

DETAILED DESCRIPTION OF THE PREFERRED EMBODIMENTS

Figure 1:
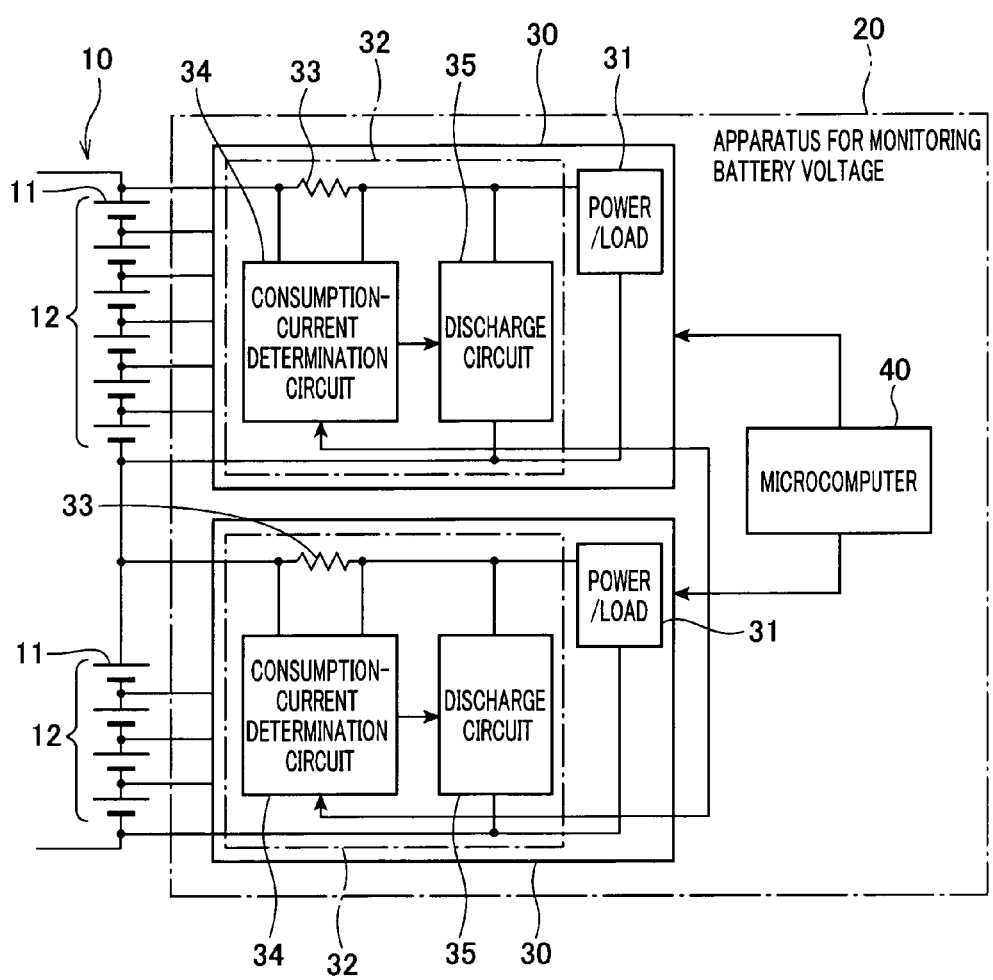
FIG. 1 is a diagram showing an entire configuration of a battery-voltage-monitoring system having a battery voltage monitoring apparatus according to a first embodiment of the present invention.

Preferred embodiments of the present invention will be described with reference to the drawings. The same or similar components and portions in the drawings are denoted by the same reference numerals.

(First Embodiment)

A first embodiment of the present invention will be described below referring to the drawing. FIG. 1 is a diagram showing an entire configuration of a battery-voltage-monitoring system including a battery voltage monitoring apparatus according to a first embodiment of the invention. As shown in FIG. 1, the battery-voltage-monitoring system includes an assembled battery 10 and the battery voltage monitoring apparatus 20.

Each assembled battery 10 includes blocks 12 connected in series. Each block 12 includes a group of cells 11 connected in series. Each cell 11 is the smallest unit in this configuration and is composed of a lithium-ion secondary battery, which is rechargeable.

In this embodiment, each block 12 has a different number of cells 11. As shown in FIG. 1, one of the blocks 12 has six cells 11, and the other block 12 has four cells 11.

The battery voltage monitoring apparatus 20 has a function to detect the remained capacity of the assembled battery 10 (hereinafter this function is referred to as a "remained-capacity-detecting function"), a function to detect overcharge and over-discharge of the cells (secondary batteries) 11 (hereinafter referred to as a "overcharge-discharge-detecting function), and a function to detect a failure of the apparatus (hereinafter referred to as a "failure-detecting function").

The remained-capacity-detecting function (for the assembled battery 10) detects the remaining capacity (state of charge: SOC) of the whole assembled battery 10 composed of the cells (secondary batteries). The state of charge is detected based on the voltage of the assembled battery 10 or/and from a current flowing in the assembled battery 10.

The overcharge-discharge-detecting function monitors the voltage of the cell 11 by comparing the voltage of the cell 11 with a threshold value. When the cell 11 is a secondary battery, the battery voltage monitoring apparatus 20 monitors whether or not the voltage of the cell 11 is in a predetermined range, which is between a threshold for detecting an overcharge and a threshold for detecting an over-discharge. The failure-detecting function detects an accidental failure in a circuit configuring the battery voltage monitoring apparatus 20.

In order to execute these functions, the battery voltage monitoring apparatus 20 includes a plurality of monitor integrated circuits (monitor ICs) 30 and a microcomputer 40.

Each monitor IC 30 is a circuit component that includes blocks 12 each having the cells 11, which are the objects to be monitored, and is operated by an operation power obtained from the block 12. The monitor IC 30 is a circuit that detects the voltage of each of the cells 11 and a current flowing in each cell 11, and equalizes the voltages of the cells 11, in accordance with a control signal from the microcomputer 40. The monitor IC 30 is provided to each of the blocks 12.

Wirings are connected to both the positive and negative poles of each cell 11. The cells 11 are connected in series, and thus a negative pole of a cell 11 and a positive pole of a neighboring cell 11 are connected with a unified single wiring, while the positive pole of the cell 11 at the highest voltage side and the negative pole of the cell 11 at the lowest voltage side are connected to individual wirings, respectively.

Each monitor IC 30 includes a power-load unit 31 and a consumption-current adjusting circuit 32. The power-load unit 31 is provided with a circuit that generates a constant voltage based on the operation power obtained from the block 12, and a circuit that operates the monitor IC. The power-load unit 31 includes a load such as a circuit that detects the voltage of the cell 11. The consumption current used in the monitor IC 30 varies depending on the performance of the load.

The consumption-current adjusting circuit 32 adjusts the consumption current used in the monitor IC 30, on the basis of the operation power of the block 12, to a desired target value. That is, the consumption-current adjusting circuit 32 orders the block 12 to discharge so that the consumption current of the monitor IC 30 can be adjusted. The consumption-current adjusting circuit 32 includes a shunt resistance 33, a consumption-current determination circuit 34, and a discharge circuit 35.

The shunt resistance 33 is used to detect the consumption current used in the monitor IC 30. One end of the shunt resistance 33 is connected to the positive pole side of the cell 11 at the highest voltage side and the other end thereof is connected to the power-load unit 31. Accordingly, the consumption current to be used in the monitor IC 30 flows from the block 12 to the power-load unit 31 via the shunt resistance 33.

The consumption-current determination circuit 34 detects the voltages of the shunt resistance 33 at both ends thereof, and determines the consumption current flowing in the shunt resistance 33 based on the voltage difference, in a predetermined frequency. Accordingly, the consumption-current determination circuit 34 is connected to both ends of the shunt resistance 33. The consumption-current determination circuit 34 determines an amount to be discharged (discharge amount) from the block 12 in order for the consumption current to have the target value, based on the determined result, and orders the discharge circuit 35 to discharge the discharge amount.

The discharge circuit 35 discharges the block 12 in accordance with a signal from the consumption-current determination circuit 34 so that the consumption current can have the target value. The discharge circuit 35 is connected to both ends of the block 12, and is configured so as to allow current to flow from the positive pole side of the block 12 to the negative pole side thereof via the discharge circuit 35.

Specifically, one end of the discharge circuit 35 is connected between the shunt resistance 33 and the power-load unit 31, and the other end thereof is connected to the negative pole of the cell 11 at the lowest voltage side in the block 12. With such a configuration, the current flowing from the block 12 to the shunt resistance 33 flows toward the discharge circuit 35 via the connecting point between the discharge circuit 35 and the power-load unit 31, whereby the discharge circuit 35 discharges the block 12.

The discharge circuit 35 can include a transistor, for example, and can be configured such that a discharge current flows when the transistor is turned on by a command signal from the consumption-current determination circuit 34.

The microcomputer 40 includes operational functions such as CPU, RAM, EEPROM and RAM (which are not shown), and executes these functions in accordance with a program stored in a ROM or the like. The microcomputer 40 outputs control signals to the monitor ICs 30 to allow the monitor ICs 30 to execute processes such as the detections of the voltages of the cells 11 and currents flowing in the cells 11.

The microcomputer 40 outputs command signals to the monitor ICs 30 to detect the voltages of the cells 11 and currents flowing in the cells 11 to thereby obtain data about the cells 11 from the monitor ICs. Accordingly, the microcomputer 40 performs processes such as a calculation of the remaining capacity of the cells 11 (state of charge of the assembled battery 10), a determination of overcharge or over-discharge thereof, a determination of failure thereof, and an equalization of the voltages thereof.

The plurality of monitor ICs 30 in the battery voltage monitoring apparatus 20 are configured so as to communicate with each other. Specifically, each of the monitor ICs 30 outputs communication data including the consumption current (determined result) determined by the respective consumption-current determination circuit 34, and receives data including the consumption current (determined result) determined by the other monitor IC 30. Accordingly, the monitor ICs 30 exchange with each other data including the consumption currents determined by the respective consumption-current determination circuits 34 to share the consumption-current data (determination results) (refer to step S34A shown in FIG. 2).

Figure 2:
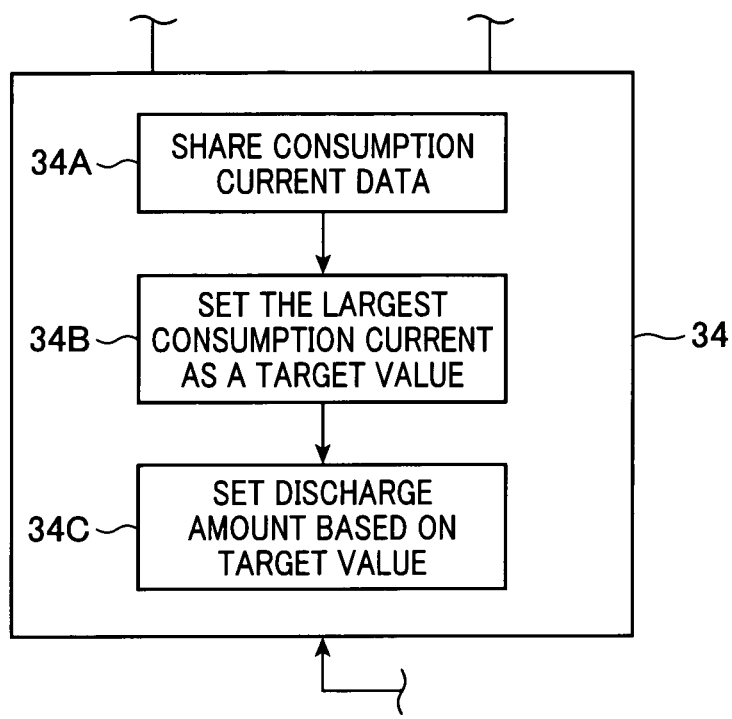
FIG. 2 is a block diagram showing functions carried out by a consumption-current determination circuit in the system according to the first embodiment.

Each consumption-current determination circuit 34 in each monitor IC 30 sets the largest value, among the determined consumption currents exchanged between the monitor ICs 30, as a desired target value (refer to step S34B as shown in FIG. 2). The discharge amount in each monitor IC 30 is determined based on the consumption current and the target value. In this embodiment, the "target value" is the largest value among the consumption currents of the monitor ICs. In other words, the largest value among the consumption currents is the target value for the plurality of monitor ICs 30 mutually. Accordingly, each consumption-current determination circuit 34 in each monitor IC 30 orders the discharge circuit 35 to discharge the discharge amount so that the consumption current in the monitor IC 30 can have the target value, which is the largest value among the determined consumption currents (refer to step S34C shown in FIG. 2)

As described above, each monitor IC 30 determines the consumption current using the consumption-current determination circuit 34, and shares the determined result with the other monitor IC 30, thereby it is possible to set the target value of the consumption currents of the monitor ICs to the consumption current having the largest value. Each monitor IC 30 can easily adjust the consumption current to the target value, using the discharge circuit 35 of the consumption-current adjusting circuit 32. Therefore, it is possible to equalize the consumption currents of the plurality of monitor ICs, even when each monitor IC 30 is connected to a different number of cells 11, respectively. As a result, the variation in the consumption currents among the plurality of monitor ICs 30 can be prevented.

Moreover, the target value of the consumption current in each monitor IC 30 is equalized with the consumption current having the largest value among the determined consumption currents. This makes it possible to most properly equalize the consumption currents among the plurality of monitor ICs 30.

In this embodiment, each monitor IC 30 includes the consumption-current adjusting circuit 32 that adjusts the consumption current, and thus the consumption currents in the monitor ICs 30 are equalized and the variation in the consumption currents thereof is prevented. Accordingly, an equalization operation of the voltages among the plurality of monitor ICs 30 is needed less or avoided. Consequently, for the assembled battery 10 often used in the situation where there is not enough time to properly equalize the voltages, it is possible to avoid the equalization operation, thereby allowing the continuous use of vehicles such as taxicabs which usually run continuously. Moreover, the overcharge or over-discharge of power can be avoided in any of the plurality of the cells 11.

Further, in this embodiment, the consumption-current determination circuit 34 determines the volume of the consumption current flowing in the shunt resistance 33, and the discharge amount is determined based on the determined result, thereby ordering the discharge circuit 35 to discharge the determined discharge amount. Therefore, each monitor IC 30 can perform a highly reliable feedback control with high accuracy with respect to the consumption current.

(Second Embodiment)

A second embodiment of the present invention will be described below focusing on features dissimilar to the first embodiment. In this second embodiment, the discharge amount is determined by detecting the voltage of the block 12, unlike the first embodiment in which the discharge amount is determined by detecting the consumption current flowing in the shunt resistance 33. A battery voltage monitoring apparatus according to the second embodiment will be described below with reference to FIG. 3.

Figure 3:
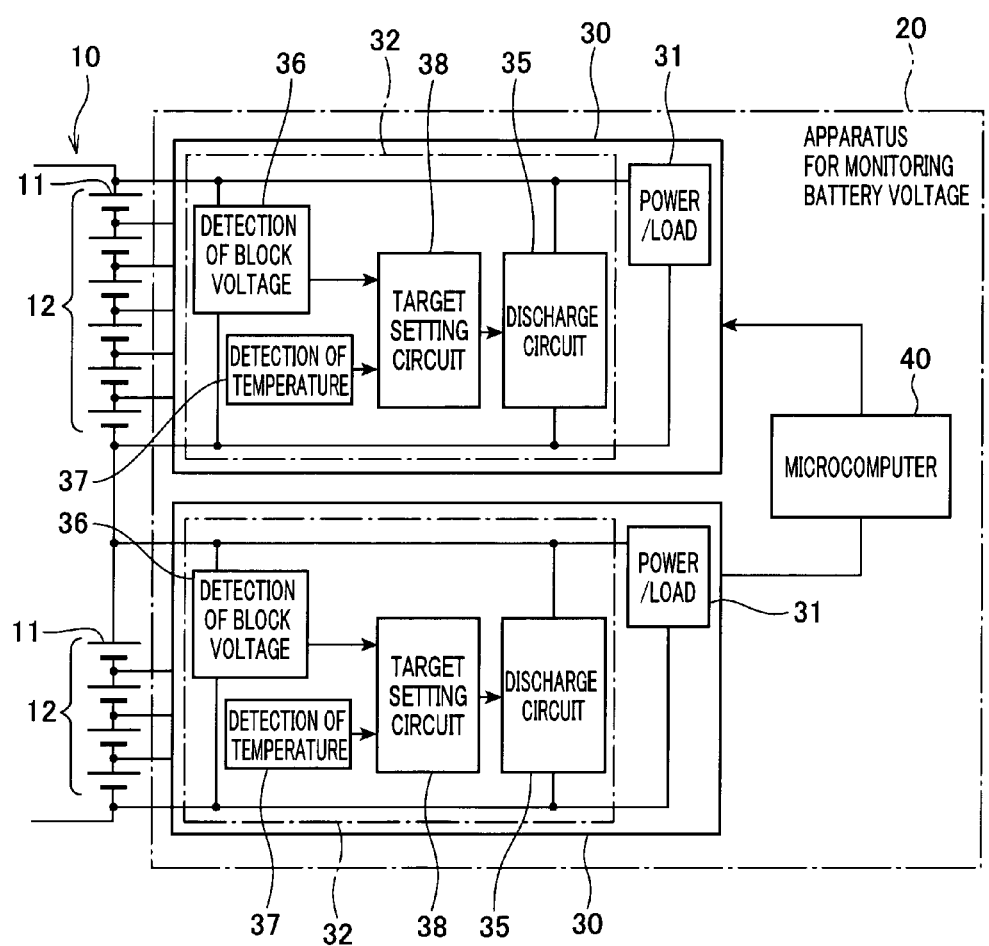
FIG. 3 is a diagram showing an entire configuration of a battery-voltage-monitoring system having a battery voltage monitoring apparatus according to a second embodiment of the invention.

FIG. 3 is a diagram fully showing the battery-voltage-monitoring system including the battery voltage monitoring apparatus of the second embodiment. As shown in FIG. 3, this embodiment includes a consumption-current adjusting circuit 32. The circuit 32 includes a block-voltage-detection circuit 36, a temperature-detection circuit 37, and a target setting circuit 38, as well as a discharge circuit 35 that is included in the first embodiment.

The block-voltage-detection circuit 36 is connected to both ends of the block 12 to thereby detect the voltage of the block 12. The block-voltage-detection circuit 36 is connected between the positive pole of the cell 11 having the highest voltage and the negative pole of the cell 11 having the lowest voltage. The voltage data of the block 12 detected by the block-voltage-detection circuit 36 is output to the target setting circuit 38.

The temperature-detection circuit 37 detects the temperature of the monitor IC 30. An element to detect the temperature includes a diode element, for example. The temperature is detected by detecting the forward voltage, which varies depending on the temperature, of the diode element. The temperature date of the monitor IC detected by the temperature-detection circuit 37 is output to the target setting circuit 38.

Figure 4:
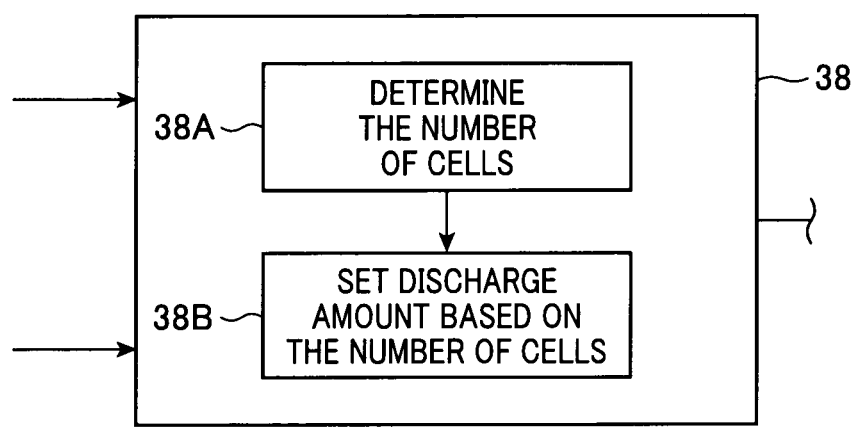
FIG. 4 is a block diagram showing functions carried out by a target setting circuit in the system according to the second embodiment.

The target setting circuit 38 determines the number of cells 11 configuring the block 12 on the basis of the voltage of the block 12 inputted from the block-voltage detection circuit 36 (refer to step S38A as shown in FIG. 4). The circuit 38 sets the discharge amount from the block 12 to adjust the consumption current to the target value based on the detected number of the cells 11 (refer to step S38B as shown in FIG. 4). The circuit 38 orders the discharge circuit 35 to discharge the discharge amount. The target value of the consumption current can be inputted from the microcomputer 40, or can be retained in the target setting circuit 38, in advance.

As aforementioned, the target value is determined based on the number of the cells 11. For example, when the number of the cells 11 is larger than a predetermined number, the monitor IC 30 is applied with a larger voltage, and thus the target setting circuit 38 determines the discharge amount to be larger. On the other hand, when the number of the cells 11 is smaller than the predetermined number, the monitor 30 is applied with a smaller voltage, and thus the target setting circuit 38 determines the discharge amount to be smaller. As described above, the target setting circuit 38 determines the discharge amount of the block 12 based on the number of the cells 11 configuring the block 12.

Moreover, the target setting circuit 38 adjusts the discharge amount of the block 12 based on the temperature of the monitor IC 30. A load current in the monitor IC 30 is mutually related to the battery voltage and the temperature, and thus the discharge amount and the target value of the consumption current are determined based on the voltage and the temperature, whereby the monitor IC 30 orders the discharge circuit 35 to discharge so that the consumption current can have the target value. That is, the consumption current of the monitor IC 30 increases when the temperature of the monitor IC 30 is high, while the consumption current of the monitor IC 30 decreases when the temperature of the monitor IC 30 is low. Accordingly, the target setting circuit 38 decreases the discharge amount when the temperature of the monitor IC 30 is high where the consumption current has been increased, and increases the discharge amount when the temperature of the monitor IC 30 is low where the consumption current has been decreased. Consequently, the target setting circuit 38 executes a fine adjustment of the discharge amount depending on the temperature of the monitor IC 30. As a result, it is possible to determine the discharge amount more accurately with respect to the temperature of the monitor IC 30.

As described above, in this embodiment, each monitor IC 30 determines the discharge amount of the block 12 based on the number of the cells 11 configuring the block 12 and the temperature of the monitor IC 30. In each monitor IC 30, the discharge amount of the monitor IC 30 is determined so that the consumption current can have the target value based on the number of the cells 11 connected to the monitor IC 30. This makes it possible to prevent the variation in the consumption currents of the plurality of the monitor ICs 30.

Unlike the configuration shown in FIG. 3 where the blocks 12 are adjacently placed, when the assembled batteries 10 are mounted on a vehicle in, for example, four different sections, the temperatures of the monitor ICs 30 can vary depending on where the cells 11 are placed. In such a situation, each monitor IC 30 is able to finely adjust the discharge amount of the block 12 depending on the temperature of the monitor IC 30. Therefore, it is possible to prevent the variation in the consumption currents utilized in the plurality of the monitor ICs 30. The battery voltage monitoring apparatus 20 according to this embodiment, which includes the temperature-detection circuit 37 in each monitor IC 30, is particularly advantageous when each monitor IC 30 is placed in a different section having a different temperature.

(Other Embodiments)

In the aforementioned first embodiment, the monitor ICs 30 are designed to mutually communicate with each other so that the target value of the consumption currents can have the largest value among the consumption currents of the monitor ICs 30. Besides such a configuration, the microcomputer 40 can be used to provide the target value to each monitor IC 30, whereby the mutual communication between the plurality of monitor ICs 30 can be avoided. Further, the consumption-current determination circuit 34 can have, in advance, the target value mutually used for the monitor ICs 30.

In the aforementioned second embodiment, the microcomputer 40 provides the target value to each monitor IC 30. Instead, it is possible to allow the monitor ICs 30 to share the information of the consumption currents, like the first embodiment. In such a configuration, each monitor IC 30 outputs the target value of the consumption current determined by the target setting circuit 38, and inputs the target value of the consumption current from the other monitor IC 30, thereby sharing the target values of the consumption currents by the plurality of the monitor ICs 30. The target setting circuit 38 of each monitor IC 30 determines the largest consumption current among the consumption currents of the monitor ICs 30 as the target value, and orders the discharge circuit 35 to discharge so that the consumption current can have the target value. Accordingly, it is possible for the consumption currents of the monitor ICs 30 to have the largest value among the consumption currents, thereby allowing the monitor ICs 30 to equalize their consumption currents most properly.

As shown in FIGS. 1 and 3, the assembled batteries 10 in the aforementioned two embodiments include two blocks 12, and the battery voltage monitoring apparatus 20 includes two monitor ICs 30, respectively. These are merely examples of the invention. Accordingly, the assembled battery 10 can include more than two blocks 12, and the battery voltage monitoring apparatus 20 can include more than two monitor ICs 30. The assembled battery 10 can be mounted on an electric vehicle such as a hybrid car and used, for example, as a power source to drive a load of an inverter and/or a motor, and/or used as a power source for electronic equipment. Accordingly, the battery voltage monitoring apparatus 20 including the assembled battery 10 can be applied to the electric vehicle including the hybrid car. In such a case, a large number of cells 11 (one hundred twenty, for example) are to be connected in series to group a block 12. Accordingly, the monitor IC 30 can be applied to the large number of cells 11 and the block 12.

The configurations described in the foregoing embodiments are just examples, and the rotary electric machine and the manufacturing method according to the present invention will not be confined to only such examples. The rotary electric machine and the manufacturing method according to the present invention may be practiced into a variety of modes to which alternations and/or improvements are added which can be conducted by the skilled in the art, without departing from the gist of the present invention.

What is claimed is:

1. A battery voltage monitoring apparatus, comprising:
a plurality of battery cells connected in series to each other, the plurality of battery cells being grouped into a plurality of blocks of battery cells, the blocks including at least one block which is different in number of battery cells from remaining blocks of the blocks;
a plurality of monitor integrated circuits assigned to the plurality of battery cells respectively, each of the plurality of monitor integrated circuits being connected parallel to the respective battery cells each belonging to a corresponding one of the blocks to monitor voltage of each battery cells; and
a plurality of consumption-current adjusting circuits each included in a corresponding one of the monitor integrated circuits, each of the consumption-current adjusting circuits obtaining power supplied from each of the blocks to adjust a consumption current of each of the monitor integrated circuits to a target value for the consumption current,
wherein each of the consumption-current adjusting circuits comprises:
a discharge circuit that enables a corresponding block of the blocks to discharge such that the consumption current in the corresponding block becomes the target value;
a block-voltage detection circuit that detects the voltage of the corresponding block;
a temperature-detection circuit that detects the temperature of a corresponding one of the monitor integrated circuits; and
a target setting circuit, the target setting circuit i) detecting a number of the cells provided in the corresponding block based on the detected voltage of the corresponding block, ii) setting a discharge amount of power in the corresponding block, based on the detected number of cells and the detected temperature of the corresponding block, such that the consumption current in the corresponding block becomes the target value, and iii) ordering the discharge circuit to discharge the set discharge amount of power.

2. A battery voltage monitoring apparatus, comprising:
a plurality of battery cells connected in series to each other, the plurality of battery cells being grouped into a plurality of blocks of battery cells, the blocks including at least one block which is different in number of the battery cells from remaining blocks of the blocks;
a plurality of monitor integrated circuits assigned to the plurality of battery cells respectively, each of the plurality of monitor integrated circuits being connected parallel to the respective battery cells each belonging to a corresponding one of the blocks to monitor voltage of each battery cells; and
a plurality of consumption-current adjusting circuits each included in a corresponding one of the monitor integrated circuits, each of the consumption-current adjusting circuits obtaining power supplied from each of the blocks to adjust a consumption current of each of the monitor integrated circuits to a target value for the consumption current,
wherein each of the consumption-current adjusting circuits comprises:
a discharge circuit that enables a corresponding block of the blocks to discharge such that the consumption current in the corresponding block becomes the target value,
a block-voltage detection circuit that detects the voltage of the corresponding block, and
a target setting circuit,
wherein each of the monitor integrated circuits is configured to output the target value to other monitor integrated circuits, and receives the target values for the consumption currents from the other monitor integrated circuits to share the target values for the consumption currents with the other monitor integrated circuits, and
wherein the target setting circuit is configured to detect the number of the cells provided in the corresponding block based on the detected voltage of the corresponding block, set the largest value among the target values of all the blocks as the target value, set a discharge amount of power in the corresponding block such that the consumption current in the corresponding block becomes the target value, based on the detected number of the cells, and ordering the discharge circuit to discharge the set discharge amount of power.

* * * * *